(No Model.)

J. F. BARRINGER.
COTTON CHOPPER.

No. 321,174. Patented June 30, 1885.

WITNESSES:
Chas. Nida
C. Sedgwick

INVENTOR:
J. F. Barringer
BY Munn & Co
ATTORNEYS.

UNITED STATES PATENT OFFICE.

JAMES F. BARRINGER, OF BENNETTSVILLE, SOUTH CAROLINA.

COTTON-CHOPPER.

SPECIFICATION forming part of Letters Patent No. 321,174, dated June 30, 1885.

Application filed December 2, 1884. (No model.)

*To all whom it may concern:*

Be it known that I, JAMES F. BARRINGER, of Bennettsville, in the county of Marlborough and State of South Carolina, have invented a new and useful Improvement in Cotton-Choppers, of which the following is a full, clear, and exact description.

Reference is to be had to the accompanying drawings, forming a part of this specification, in which similar letters of reference indicate corresponding parts in all the figures.

Figure 1:
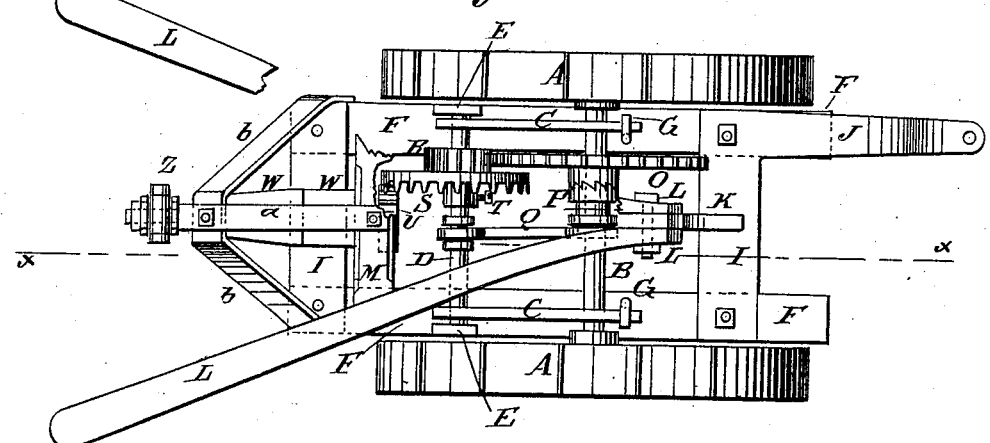
Figure 2:
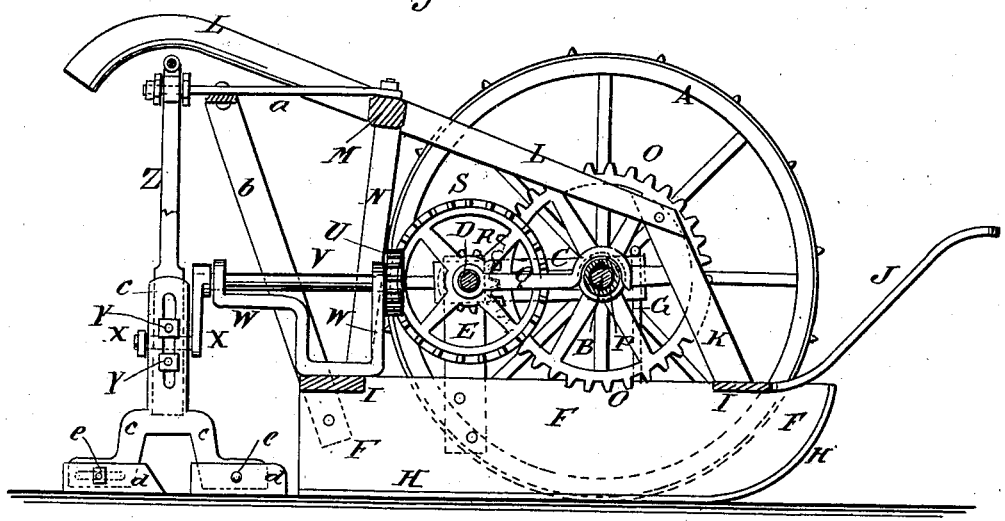
Figure 3:
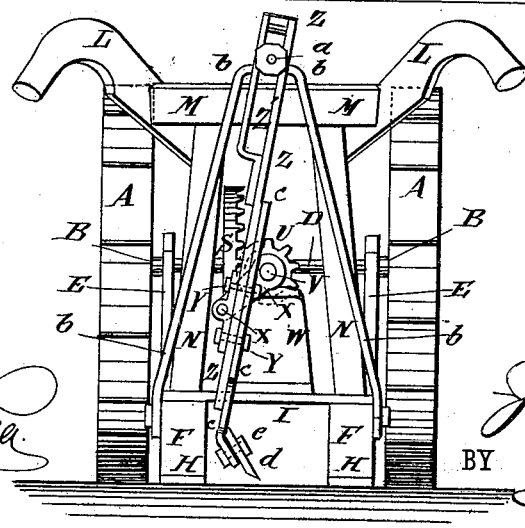

Figure 1 is a plan view of one of my improved cotton-choppers, parts being broken away. Fig. 2 is a sectional side elevation of the same, taken through the line $xx$, Fig. 1. Fig. 3 is a rear elevation of the same.

The objects of this invention are to facilitate the chopping of cotton to a stand and to promote convenience in adjusting, operating, and controlling cotton-choppers.

The invention relates to a cotton-chopper constructed with wheels and an axle, and runners connected by a shaft, pivoted bars, and standards, and chopping-hoes attached to a swinging extension-bar vibrated by a crank-shaft driven from the wheels and axle by a train of gear-wheels, as will be hereinafter fully described, and then claimed.

A are the drive-wheels, which are made with corrugated faces to prevent them from slipping upon the ground. The axle B of the wheels A revolves in bearings in the forward ends of two bars, C, in the rear ends of which are formed bearings to receive the shaft D. The shaft D also revolves in bearings in the upper ends of two standards, E, the lower ends of which are rigidly attached to two runners, F, so that the wheels A and runners F can have an up and down movement independent of each other, which movement is limited by the stop-rods G, the lower ends of which are attached to the runners F in such positions that the hooks formed upon the upper ends of the said rods will engage with the forward parts of the swinging bars C or with the axle B. The runners F can be provided with shoes H of metal or other suitable material to receive the wear, and which can be readily replaced when worn by new ones. The runners F are connected at their rear and forward ends and held in proper relative positions by cross-bars I attached to the tops of said runners. To the forward cross-bar I, at its left-hand end, is attached, or upon it is formed, a bar, J, which is bent upward and forward to bring its forward end into position to receive the draft.

To the center of the forward cross-bar I is attached a standard, K, to the upper end of which are secured by a bolt or other suitable means the forward ends of the handles L. The handles L at held at the proper distance apart by a cross-bar, M, the ends of which are attached to the middle parts of the said handles L.

To the cross-bar M are attached the upper ends of two uprights, N, the lower ends of which are attached to the rear ends of the runners F.

Upon the drive-wheel shaft B is placed a large gear-wheel, O, upon one end of the hub of which are formed clutch-teeth to engage with the clutch P, sliding upon the shaft B. The clutch P when thrown into and out of gear with the gear-wheel is held in either position by a bar, Q, pivoted on the rear shaft, D, or other suitable support. The teeth of the large gear-wheel O mesh into the teeth of the small gear-wheel R placed upon the shaft D, and rigidly connected with the beveled or crown gear-wheel S, also placed upon the shaft D and secured to it adjustably by a set-screw, T, passing through its hub and resting against the said shaft, so that the said gear-wheel S can be readily adjusted upon the said shaft. The small gear-wheel R is made wide so that it will not be thrown out of gear with the gear-wheel O by the adjustment of the gear-wheel S.

If desired, the gear-wheels R S can be made separate, in which case the gear-wheel R will be rigidly attached to the shaft D, and need not be made wide. The teeth of the beveled or crown gear-wheel S mesh into the teeth of a small corresponding gear-wheel, U, secured detachably by a set-screw or other suitable means to the forward end of the shaft V, which revolves in bearings in a bracket, W, attached to the center of the rear cross-bar I.

To the rear end of the shaft V is attached or upon it is formed a crank, X, the pin of which revolves in a bearing secured by bolts Y to the lower part of a bar, Z, the upper part of which is provided with a slot, $Z'$, to receive the rear end of the bar a, so that the said bar Z can move up and down and will have its movements controlled as it is vibrated by the revolution of the crank X. The forward end of the bar a is attached to the crossbar M of the handles L, and its rear part is attached to the bend of a U-bar, b, the ends of which are attached to the rear ends of runners F.

To the lower end of the bar Z is secured by the bolts Y, that fasten the bearings for the crank X, the upper part of the bar c, which is slotted to receive the said bolts, so that the said bar c can be readily adjusted higher or lower as may be required. The lower end of the bar c is forked, and the ends of its prongs are bent outward, and their lower parts are inclined to one side to form seats for the chopping holes or cutters d, which are secured to the said prongs by the bolts e. The rear prong of the forked lower end of the bar c is slotted to receive the bolt e, as shown in dotted lines in Fig. 2, so that the rear chopping-hoe can be readily adjusted nearer to or farther from the forward chopping-hoe, according as less or more plants are to be left for a hill. The space between the hills is regulated by the size of the gear-wheel U—as, for instance, the said wheel can be made of such a size as to make a revolution while the drive-wheels A are advancing twelve inches—or the wheel U can be replaced by a larger or smaller gear-wheel, as may be desired, the gear-wheel S being adjusted upon the shaft D to mesh into the gear-wheel U, whether the said wheel U be larger or smaller. With this machine the runners F will move along the smooth top of the ridge upon the opposite sides of the row of plants, so that the chopping-hoes d will enter the ground to a uniform depth, and will be unaffected by the up and down movements of the wheels A as they travel along the sides of the said ridge.

Having thus fully described my invention, I claim as new and desire to secure by Letters Patent—

1. In a cotton-chopper, the combination, with the drive-wheels, of runners pivoted to the axle of the said wheels and carrying the hoes and their operating mechanism, substantially as herein shown and described, whereby provision is made for causing the hoes to enter the ground at a uniform depth, as set forth.

2. In a cotton-chopper, the combination, with the drive-wheels and axle A B and the runners F, of the pivoted bars C, the shaft D, and the standards E, substantially as herein shown and described, whereby the said wheels and axle and the runners will be drawn forward together, but can move up and down independently of each other, as set forth.

3. In a cotton-chopper, the combination, with the wheels and axle A B, the runners F, and the swinging extension-bar Z c, carrying the chopping-hoes, of the gear-wheels O R S U and the crank-shaft V X, substantially as herein shown and described, whereby the said swinging hoe will be vibrated by the advance of the machine, as set forth.

4. In a cotton-chopper, the combination, with the runners F, of the extension-bar Z c, carrying the chopping-hoes and having the slot Z', the handles L, the cross-bar M, attached to the handles and the bars a b, substantially as herein shown and described.

5. In a cotton-chopper, the extension-bar carrying the chopping-hoes, made substantially as herein shown and described, and consisting of the upper bar, Z, having slot Z', and the lower bar, c, having slotted upper end and a forked lower end, and provided with a slot in its rear prong, whereby the chopping-hoes can be readily adjusted to work deeper or shallower in the ground, and to leave more or less plants for a hill, as set forth.

J. F. BARRINGER.

Witnesses:
B. A. ROGERS,
E. C. STUART.